July 4, 1933.    W. L. RHODES    1,916,637
LISTER ATTACHMENT
Filed Dec. 21, 1931    2 Sheets-Sheet 1

Inventor
W. L. Rhodes.
By
Attorneys

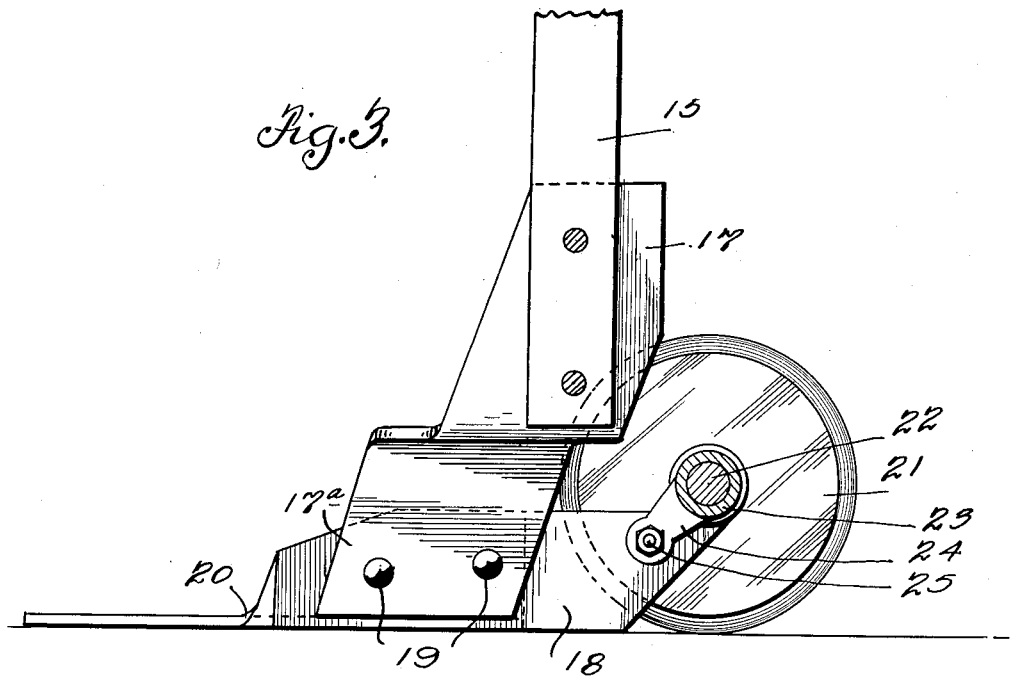
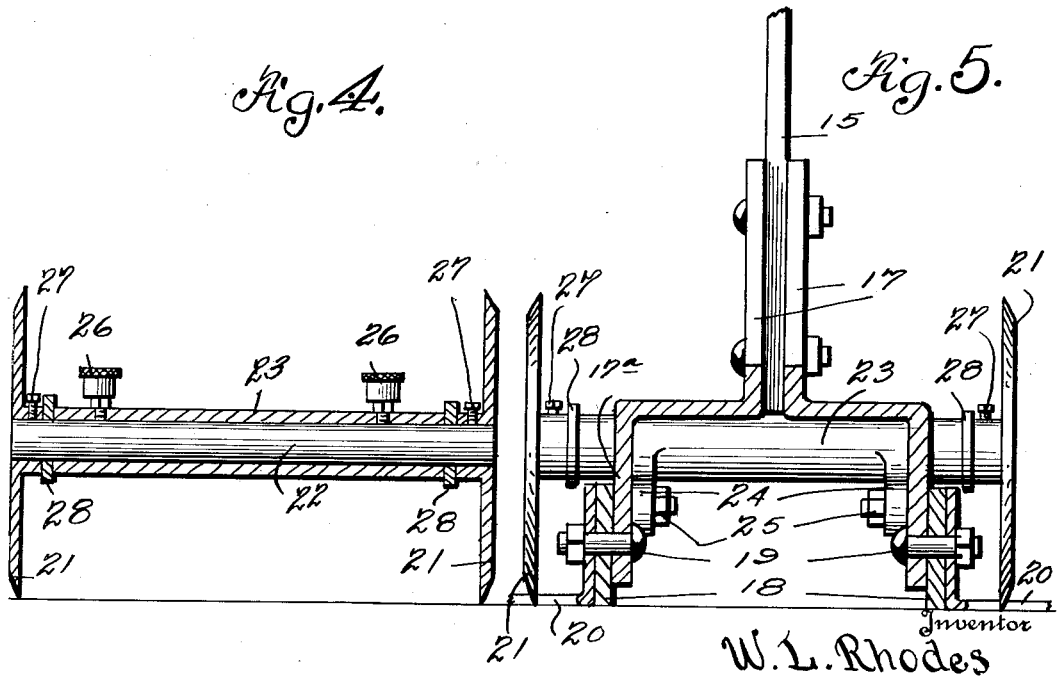

Patented July 4, 1933

1,916,637

UNITED STATES PATENT OFFICE

WADDILL L. RHODES, OF SAN JON, NEW MEXICO

LISTER ATTACHMENT

Application filed December 21, 1931. Serial No. 582,463.

My invention relates to improvements in cultivators, planters and similar farm machinery and particularly in the provision of a novel lister attachment therefor.

Briefly stated, the invention has for its primary object the provision of an attachment which can be readily applied to the ordinary types of planters, cultivators and the like,—the nature of such attachment being such that its use will effectually protect the plants against injury through the dragging of weeds or the like.

Another object of the invention is to provide a lister attachment which incorporates novel means for cutting weeds and trash.

The invention also resides in certain novel features of construction, combination and arrangement of the various parts and in modes of application to cultivators and planters to be operated by the usual control means thereof,—all of which will be readily understood and appreciated by those skilled in the art upon reference to the accompanying drawings forming a part of this specification.

While the preferred form of the invention has been chosen for purposes of illustration herein,—yet it will be understood that the illustrated form of the improvements are capable of considerable change and modification within the spirit and scope of the subject matter claimed hereinafter.

In the drawings,

Figure 3 is a sectional view taken on line 3—3 of Figure 2;

Figure 4 is a sectional view through the disks and bearing for the shaft thereof,—the view being taken on the line 4—4 of Figure 2, the brackets being omitted, and Figure 5 is a cross sectional view taken on the line 5—5 of Figure 2, the grease cups being omitted.

Figure 1:
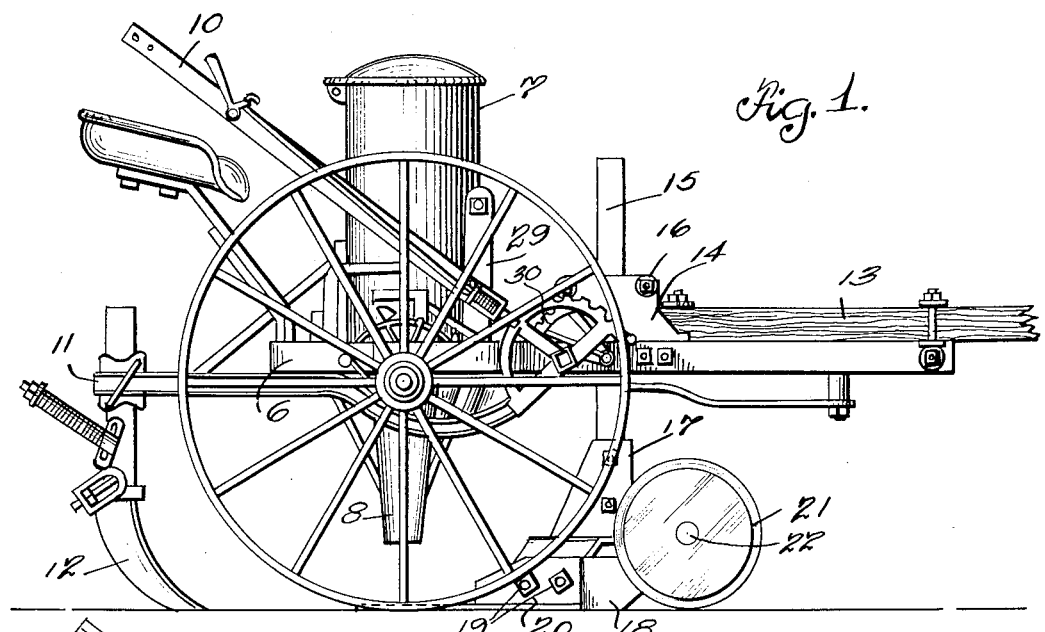
Figure 1 is a side elevational view of a familiar form of seed planter and illustrating the application of my invention thereto.
Figure 2:
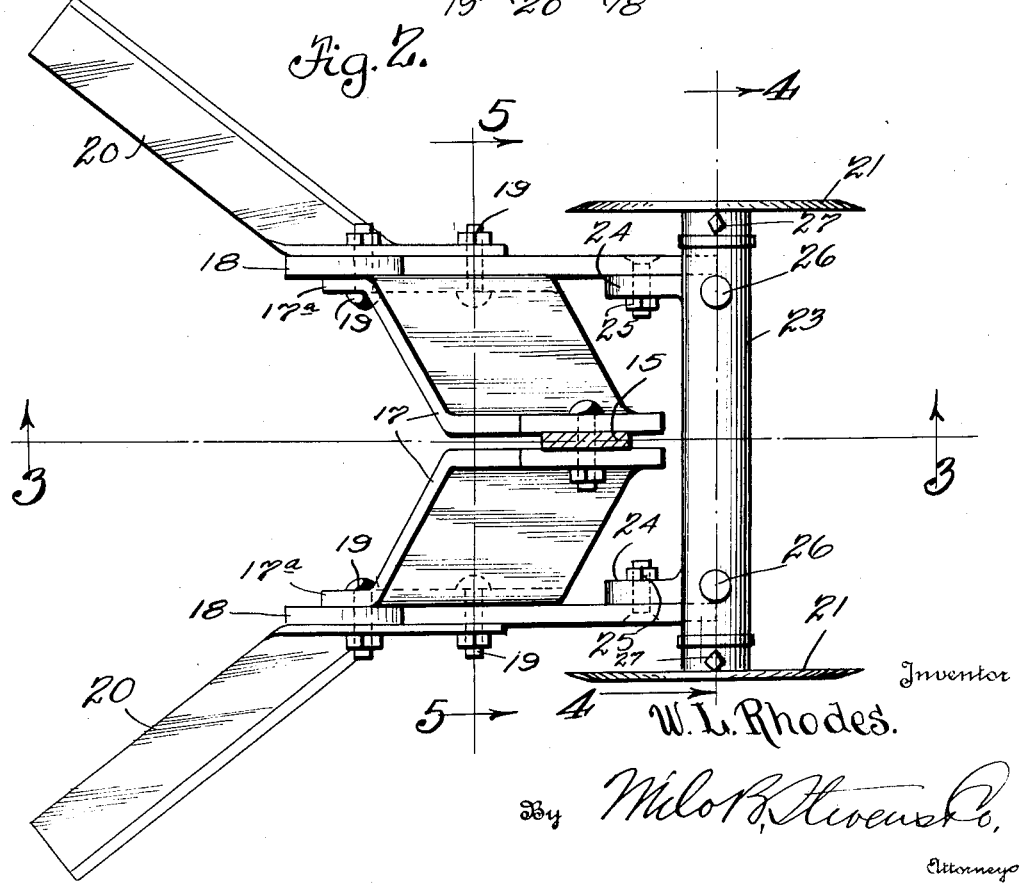
Figure 2 is a plan view, partly in section and illustrating my attachment.

Referring specifically to the drawings, wherein the same reference characters have been used to designate the same parts in all views, numeral 6 denotes the planter frame there being provided the seed container 7 and seed discharge tube 8 in addition to the auxiliary frame member 11 extending rearwardly and carrying the shovels 12, as shown in Figure 1. The parts just described are conventional and form no part of my invention.

Figure 1 illustrates that the tongue 13 of the planter has adjacent its rear end the vertical bearing 14 which is carried by the frame 6 and serves as a guide for the vertically adjustable post 15,—the bearing 14 having guide rolls 16 to engage the said post 15, which is controlled by the lever 10. Ordinarily, the post 15, or equivalent, carries suitable shovels for breaking up the ground in advance of the seed discharge tube 8.

As clearly shown, the lower end of the post 15 has bolted thereto the upper vertical portions of the plate members 17 which provide the hood which is adapted to pass over the plants being cultivated. The outer portion of each of the members 17 terminates in a vertical flange 17$^a$ to which is adapted to be bolted the runners 18 and the flat cutter blades or knives 20,—the same bolts 19 serving to hold the aforementioned parts in assembled relationship.

In advance of the knives 20 and adjacent the pointed forward ends thereof are the disks 21 which are carried upon a shaft 22 extending through the bearing sleeve 23 which is disposed intermediate the hub portions of the disks 21. Outwardly of the ends of the sleeve 23, are carried supporting brackets 24, which are bolted as at 25 to the forward upper portion of the runners 18. Grease cups 26 are shown for lubricating the shaft 22 in its bearing sleeve 23.

Figure 4 illustrates spacer washers 28 disposed between the ends of the sleeve 23 and the hub portions of disks 21,—this view also showing set screws or bolts 27 extending through the hub portions of the disks 21 for securing the same upon the shaft 22.

The operation of the novel lister attachment will be readily apparent from the foregoing description. However, the operation may be briefly summarized by saying that as the wheel seeder is drawn across the field the disk members are disposed on each side of a row of plants, corn for instance,—and serves to cut weeds and trash in advance of the knives 20. The knives normally set about an inch below the disks 21 and serve to cut and throw the trash and other matter laterally away from the plantes. The major horizontal portions of the plates 17 providing the hood are disposed sufficiently high as to not interfere with the plants being cultivated. The device can be readily attached or detached as occasion may require, it being understood that the lever 10 operates the member 15 through the gearing 30 in the usual manner. Since the specific operation of member 15 is immaterial to the present invention the detailed actuating elements controlled by lever 10 have not been illustrated.

Having thus described my invention, what I claim as new and desire to secure by Letters Patent is:

1. In a seed planter or the like including a wheeled-frame and having a vertically movable post element extending toward the ground in advance of the planting device; a lister attachment adapted to be secured to said post and incorporating divergent plate members providing a substantially U-shaped hood adapted to straddle a row of plants, runners carried by the lower portions of said hood, a sleeve extending across said runners at the forward ends thereof and secured thereto, a shaft extending through said sleeve, cutting disks carried by said shaft for cutting weeds and trash, knives carried by said runners at their outer sides and adjacent the lower edges thereof, means for lubricating said shaft through said sleeve, and washers disposed between the ends of said sleeve and the disks carried by said shaft.

2. In a seed planter or the like including a wheeled-frame and having a vertically movable post element extending toward the ground in advance of the planting device; a lister attachment adapted to be secured to said post and incorporating divergent plate members providing a substantially U-shaped hood adapted to straddle a row of plants, runners carried by the lower portions of said hood, a sleeve extending across said runners at the forward ends thereof and secured thereto, a shaft extending through said sleeve, cutting disks carried by said shaft for cutting weeds and trash, and knives carried by said runners at their outer sides and adjacent the lower edges thereof.

3. In a seed planter or the like including a wheeled frame and having a vertically movable post element extending toward the ground in advance of the planting device; a lister attachment adapted to be secured to said post and incorporating divergent plate members providing a substantially U-shaped hood adapted to straddle a row of plants, runners carried by the lower portions of said hood, a shaft extending across said runners at the forward ends thereof and secured thereto, cutting disks carried by said shaft for cutting weeds and trash, and knives carried by said runners at their outer sides and adjacent the lower edges thereof.

In testimony whereof I affix my signature.

WADDILL L. RHODES.